Patented Aug. 22, 1950

2,520,095

UNITED STATES PATENT OFFICE 2,520,095

PREPARATION OF VULCANIZATION ACCELERATORS

Albert F. Hardman, Akron, Ohio, assignor to Wingfoot Corporation, Akron, Ohio, a corporation of Delaware No Drawing. Application March 19, 1947, Serial No. 735,799

9 Claims. (Cl. 260—788)

This invention relates to accelerators for the vulcanization of rubber and, more particularly, to the preparation of a plurality of accelerators by a single reaction.

Many materials useful as accelerators of the vulcanization of rubber are known. Among these are the thiuram disulfides, mercaptothiazoles and salts of the latter. According to the present invention, thiuram disulfides and thiazole salts or thiazoles are prepared by a single process.

Fundamentally, the invention involves the reaction of a secondary amine, carbon bisulfide and a dithiazyl disulfide. The basic reaction may be represented by Equation A, using diethylamine and dibenzothiazyl disulfide as typical materials.

(A)

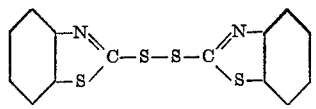

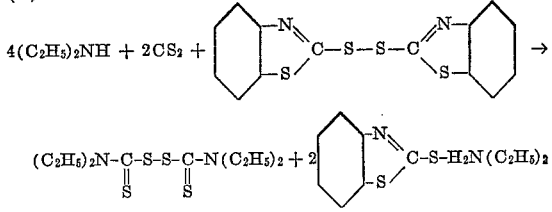

The products are tetraethyl thiuram disulfide and the diethyl amine salt of mercaptobenzothiazole. If desired, the amine salt of the thiazole may be converted to the free thiazole by acidifying the reaction product, for example with sulfuric acid.

The order of mixing the reactants is not critical. Thus, the amine and carbon bisulfide may be reacted to form a dithiocarbamate (or dithiocarbamic acid), which is then reacted with the dithiazyl disulfide, as illustrated by the following equations.

(B)

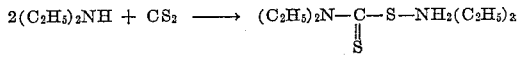

(C)

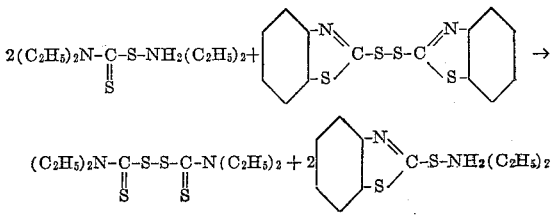

Also, metal dithiocarbamates, such as sodium, lead, zinc and other dithiocarbamates may be employed.

Alternatively, the dithiazyl disulfide may first be reacted with the amine to form in situ a mixture of a sulfenamide and an amine salt of a thiazole, which mixture may then be reacted with the carbon bisulfide according to the following equations.

(D)

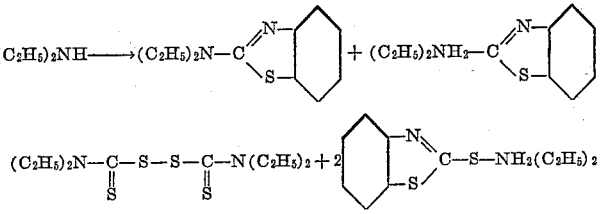

Any other order of mixing may be employed, as desired.

If desired, the free thiazole may be obtained instead of the amine salt merely by varying the proportions of reactants according to Equation E, following.

(E)

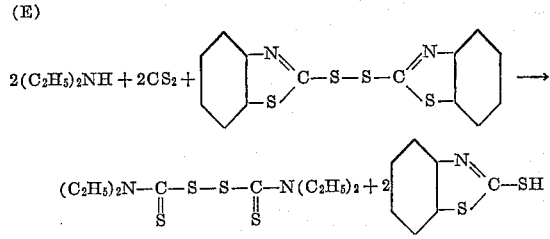

Thus, it is apparent that the basic process is subject to considerable variation, while still obtaining the desired results.

The practice of the invention is illustrated by the following examples.

*Example 1*

Thirty grams of diethyl amine (0.4 mol) were slowly stirred into a mixture of 200 cc. of benzene and 16 grams of carbon bisulfide (0.2 mol), thereby forming in solution diethyl-ammonium diethyl dithiocarbamate. Thirty-three grams of dibenzothiazyl disulfide (0.1 mol) were then added and the mixture was stirred. There was a mild heat of reaction, nearly all of the dibenzothiazyl disulfide going into solution, and then, in a few seconds, the mixture set to a mass of crystals. The mixture was then heated under reflux on a steam bath for 1 hour, the crystals redissolving. The solution was then cooled and the crystals which separated were filtered off and washed with cold benzene. Thirty-five grams of crystals, melting at 131–133° C., were obtained. This material was identified by mixed melting point as the diethyl-ammonium salt of 2-mercaptobenzothiazole. The filtrate was then distilled on a steam bath under reduced pressure and the liquid residue was crystallized from alcohol. Seventeen and one-half grams of crystals were obtained, melting at 72–73° C. This was identified by mixed melting point as tetraethyl thiuram disulfide.

*Example 2*

Thirty-one grams of carbon bisulfide (0.4 mol) were added slowly, with cooling, to a solution of 30 grams of diethyl amine (0.4 mol) and 17 grams of sodium hydroxide (0.4 mol) in 300 cc. of water, producing sodium diethyl dithiocarbamate. When the reaction was complete, 66 grams of dibenzothiazyl disulfide (0.2 mol) were added to the clear yellow solution of sodium diethyl dithiocarbamate, and the mixture was stirred rapidly while 20 grams of concentrated sulfuric acid, diluted to 200 cc. were slowly added. The resulting suspension was stirred for a short time, allowed to stand over night at room temperature, then filtered and washed. One hundred eleven grams of a fine crystalline product were obtained.

(G)

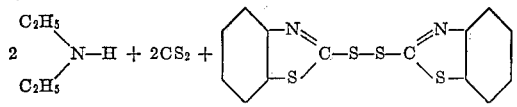

This was a mixture which melted over a range of 70–110° C. The mixture was treated with about 200 cc. of hot benzene, cooled and filtered. The insoluble residue obtained amounted to 42 grams and melted at 175–177° C. It was identified by mixed melting point as 2-mercaptobenzothiazole. The benzene was then distilled off as in Example 1, and the residue was treated with alcohol. Forty-one grams of brown, waxy crystals were obtained. The white crystals obtained by recrystallization from acetone melted at 72° C. Mixed with tetraethyl thiuram disulfide, the melting point was also 72° C.

The reaction in this case may be represented as follows:

(F)

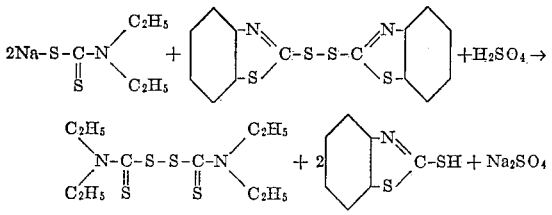

*Example 3*

Sixteen grams of carbon bisulfide (0.2 mol) were added slowly, with cooling, to a mixture of 16 grams of diethylamine (0.2 mol) and 33 grams of dibenzothiazyl disulfide (0.1 mol) in 100 cc. of benzene. The suspension of dibenzothiazyl disulfide crystals disappeared, to be replaced almost immediately by another crystalline material which, after two hours at room temperature, was filtered off, washed with benzene and dried. This product proved to be 2-mercaptobenzothiazole and weighed 26 grams, or a 79 percent yield. The filtrate was then treated as in Example 1 and 21 grams, or 71 percent of the theoretical yield, of tetraethyl thiuram disulfide were obtained.

By adding an organic base, such as a tertiary amine or a guanidine, to the reaction mass, the mercaptothiazole may be obtained as a salt of the added base. This is illustrated by the following example.

*Example 4*

Sixteen grams of diethylamine (0.2 mol) were added gradualy to a mixture of 16 grams of carbon bisulfide (0.2 mol), 33 grams of dibenzothiazyl disulfide (0.1 mol), 42 grams of diphenyl guanidine (0.2 mol) and 200 cc. of benzene. The mixture became hot and quickly set to a crystalline cake. This was broken up and heated at reflux for one hour, after which the crystals were filtered off, washed and dried. This product was identified as the diphenyl guanidine salt of 2-mercaptobenzothiazole. It weighed 64 grams and melted at 170–171° C. The filtrate was treated as in Example 1 to recover the tetraethyl thiuram disulfide. The reaction may be represented by the following equation.

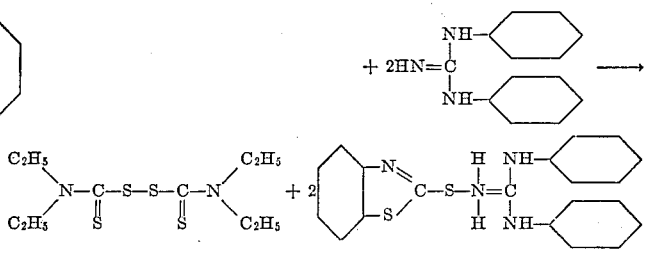

Any secondary amine may be used in which at least one of the substituents is selected from the group consisting of aliphatic, cycloaliphatic, aralkyl, furfuryl and tetrahydrofurfuryl radicals. Secondary amines in which both substituents are selected from this group constitute a prefered class. Thus, other secondary aliphatic amines may be employed in place of the diethyl amine of the foregoing examples. Also, the aliphatic radicals may be replaced with cycloaliphatic or alicyclic radicals or by substituted aliphatic or alkyl radicals, such as aralkyl, furfuryl and tetrahydrofurfuryl radicals, such radicals being equivalents of alkyl or other aliphatic radicals in this invention. The hydrocarbon radicals are preferred, but further substituents may be present provided only that, in accordance with principles recognized by those skilled in the art, such further substituents do not enter into the reaction or destroy the accelerating power of the products.

Further examples of such amines are dimethylamine, di-n-propyl amine, di-isopropyl amine, the dibutylamines, the diamylamines, diallylamine, dicyclohexylamine, di - ac - tetrahydronaphthylamine, di-decahydronaphthylamine, dibenzylamine, di-β-phenethyl amine, difurfurylamine, di-tetrahydrofurfuryl amine, N-ethyl cyclohexylamine, morpholine, N-isopropyl furfurylamine, N-cyclohexyl tetrahydrofurfurylamine, N-n-butyl benzylamine, N-β-phenethyl hexahydrophenetidine, N-methyl aniline, N-cyclohexyl anisidine, N-furfuryl-β-naphthylamine, N-beta-anilinoethyl aniline, N-beta-toluidinoethyl aniline, etc.

Similarly, other dithiazyl disulfides may be used in place of the dibenzothiazyl disulfide of the examples, further illustrations being di-tetrahydro-benzothiazyl-disulfide, dinaphtho-thiazyl-disulfide, dithiazyl disulfide, di-4-ethylthiazyl-disulfide, di-4,5-dimethyl-thiazyl-disulfide.

As previously pointed out, the order of mixing the materials is not critical. For example, an experiment was carried out with the same materials as in Example 1, but in which the dibenzothiazyl disulfide was first reacted with the amine in the benzene after which the CS₂ was added and the mixture refluxed as before. The solution, treated as in Example 1, yielded 34 grams of the diethyl ammonium salt of 2-mercaptobenzothiazole and 18 grams of tetraethyl thiuram disulfide.

Temperatures are not critical. The reaction proceeds even at room temperatures, the heating being merely to shorten the time of reaction, any temperature below the decomposition point of the most sensitive material being operative.

Various other solvents may also be employed instead of benzene and, in fact, it is also possible to carry out the reaction in the absence of an added solvent. The particular details of manipulation and of recovery of product will vary somewhat with different solvents depending upon the solubility of the starting materials and the products, but these details lie within the skill of the chemist and form no part of the present invention.

Both compounds resulting from the reaction are useful as accelerators of the vulcanization of rubber and, therefore, can be used, without separation, for this purpose.

While the examples with diethyl amine illustrate the nature of the reaction, the use of higher dialkyl amines such as dibutyl or diamyl offers certain desirable features. Thus, such amines, being less volatile and somewhat slower in reaction, may be reacted with CS₂ without using a solvent. In addition, the salts of these amines with 2-mercaptobenzothiazole and other thiazoles, as well as the thiurams derived from the amines, are liquids or low-melting solids, which facilitates dispersion in rubber stocks.

The following examples illustrate these advantages.

Example 5

Seventy-six grams of carbon bisulfide (1 mol) were stirred rapidly in a flask cooled in ice and 260 grams of di-n-butyl amine (2 mols) were added over a period of about 20 minutes, at a rate such that the temperature did not rise above 30 to 40° C., until towards the end, when the temperature was allowed to go as high as 50° C. to prevent crystallization. One mol of dibenzothiazyl disulfide (166 grams) was then added and the mixture was heated to about 90° C. on a steam bath and stirred rapidly for three hours and then was poured into sample bottles. This mixture, on long standing or on seeding and stirring, showed some tendency towards crystallization, but by using mixed diamyl amine instead of dibutyl amine, it was found that this tendency to crystallize was entirely eliminated.

Example 6

Nineteen grams of CS₂ (0.25 mol), 78.5 grams of mixed diamyl amines (0.5 mol) and 41.5 grams of dibenzothiazyl disulfide (0.125 mol) were reacted as in Example 5. The product remained entirely liquid at ordinary temperatures.

Mixtures of amines may also be employed, such mixed products tending to be liquids with little or no crystalline material present. The preparation of such mixed products is illustrated by the following example.

Example 7

One hundred fifty-two grams of carbon bisulfide (2 mols), 413.6 grams of n-dibutyl amine (3.2 mols), 125.8 grams of mixed diamyl amines (0.8 mol) and 330 grams of dibenzothiazyl disulfide (1 mol) were reacted as follows. The CS₂ was stirred rapidly in a two litre flask cooled in ice and the mixed amines were added at such a rate that the temperature did not rise above 45° C. To the resulting mixture of liquid dithiocarbamates, the dibenzothiazyl disulfide was added and the mixture was then stirred for one hour while heating to 90–93° C. on a steam bath. Neither the time of heating nor the temperature is critical, since reaction occurs even at room temperature, but since the mixture is rather viscous at ordinary temperatures, it is convenient to heat to a sufficient degree to permit easy stirring.

The foregoing illustrative examples demonstrate that the invention is subject to considerable variation without departing from the scope and spirit of the invention.

I claim:

1. A process which comprises reacting carbon bisulfide, a dithiazyl disulfide and a secondary amine in which at least one of the substituents is a radical selected from the group consisting of aliphatic, cycloaliphatic, aralkyl, furfuryl and tetrahydrofurfuryl radicals.

2. A process which comprises reacting carbon bisulfide, a dithiazyl disulfide and a secondary amine in which the substituents are selected from the group consisting of aliphatic, cycloaliphatic, aralkyl, furfuryl and tetrahydrofurfuryl radicals.

3. A process which comprises reacting a dialiphatic amine, carbon bisulfide and a di(arylene thiazyl) disulfide.

4. A process which comprises reacting diethyl amine, carbon bisulfide and di(benzothiazyl) disulfide.

5. A process for preparing a mixture of a tetraalkyl thiuram disulfide and an amine salt of a mercaptoarylene thiazole which comprises reacting two mols of a dialkyl ammonium dialkyl dithiocarbamate with one mol of a di(arylene thiazyl) disulfide.

6. A process for preparing a mixture of a tetraalkyl thiuram disulfide and a metal salt of a mercaptoarylene thiazole which comprises reacting two mols of a metal salt of a dialkyl dithiocarbamic acid with one mol of a di(arylene thiazyl) disulfide.

7. A process for preparing a mixture of a tetraalkyl thiuram disulfide and a mercaptoarylene thiazole which comprises reacting two mols of a dialkyl dithiocarbamate with one mol of a di(arylene thiazyl) disulfide to produce a tetraalkyl thiuram disulfide and a salt of a mercaptoarylene thiazole and then adding an acid to the reaction mixture to convert the salt of the mercaptoarylene thiazole to the free thiazole.

8. A process which comprises reacting di-n-butylamine, carbon bisulfide and di(benzothiazyl) disulfide.

9. A process which comprises reacting mixed diamyl amines, carbon bisulfide and di(benzothiazyl) disulfide.

ALBERT F. HARDMAN.

(References on following page)

REFERENCES CITED

The following references are of record in the file of this patent:

UNITED STATES PATENTS

| Number | Name | Date |
|---|---|---|
| 2,014,353 | Cramer | Sept. 10, 1935 |
| 2,284,578 | Jones | May 6, 1942 |

OTHER REFERENCES

Blake, Jour. Am. Chem. Soc., vol. 65, pp. 1267-1269, July, 1943.